United States Patent
Kothiwale et al.

(10) Patent No.: US 12,075,284 B2
(45) Date of Patent: Aug. 27, 2024

(54) METHOD AND SYSTEM FOR MANAGING ORIENTATION OF CONSUMER PREMISE EQUIPMENT

(71) Applicant: SAMSUNG ELECTRONICS CO., LTD., Suwon-si (KR)

(72) Inventors: Mahantesh Kothiwale, Bangalore Karnataka (IN); Arvind Ramamurthy, Bangalore Karnataka (IN); Yunas Rashid, Bangalore Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 17/715,633

(22) Filed: Apr. 7, 2022

(65) Prior Publication Data

US 2022/0330094 A1    Oct. 13, 2022

Related U.S. Application Data

(63) Continuation of application No. PCT/KR2022/004638, filed on Mar. 31, 2022.

(30) Foreign Application Priority Data

Apr. 7, 2021   (IN) ............... 202141016354
Mar. 11, 2022  (IN) ............... 2021 41016354

(51) Int. Cl.
*H04W 28/08*    (2023.01)
*H04B 7/06*     (2006.01)
(Continued)

(52) U.S. Cl.
CPC ...... *H04W 28/0967* (2020.05); *H04B 7/0695* (2013.01); *H04B 17/327* (2015.01);
(Continued)

(58) Field of Classification Search
CPC ........ H04W 28/0967; H04W 28/0268; H04W 72/046; H04W 72/543; H04B 7/0695; H04B 17/327; H04B 17/318
See application file for complete search history.

(56) References Cited

U.S. PATENT DOCUMENTS 7,432,868 B2    10/2008  Webb et al.
10,951,306 B1 *  3/2021  Thommana ............ G06N 20/00
(Continued)

FOREIGN PATENT DOCUMENTS

CN       1545165     11/2004
CN     101943913     11/2012
(Continued)

OTHER PUBLICATIONS

Indian Office Action issued Nov. 22, 2022 in corresponding Indian Patent Application No. 202141016354.
(Continued)

*Primary Examiner* — Harry H Kim
(74) *Attorney, Agent, or Firm* — Nixon & Vanderhye P.C.

(57) ABSTRACT

Embodiments herein provide a method for managing orientation of a CPE (402). The method includes: detecting, by the CPE (402), that the CPE (402) is in a first orientation and connected to at least one first beam of at least one of a network element (600) and an electronic device (500). Further, the method includes detecting, by the CPE (402), a requirement for connecting to at least one second beam of at least one of the network element (600) and the electronic device (402). Further, the method includes changing, by the CPE (402), the CPE (402) to a second orientation for connecting to the at least one second beam.

10 Claims, 25 Drawing Sheets

(51) Int. Cl.
*H04B 17/318* (2015.01)
*H04B 17/327* (2015.01)
*H04W 28/02* (2009.01)
*H04W 72/044* (2023.01)
*H04W 72/543* (2023.01)

(52) U.S. Cl.
CPC ..... *H04W 28/0268* (2013.01); *H04W 72/046* (2013.01); *H04W 72/543* (2023.01)

(56) References Cited

U.S. PATENT DOCUMENTS

| | | | |
|---|---|---|---|
| 2009/0109426 A1* | 4/2009 | Cramer | G01S 17/66 356/154 |
| 2015/0263408 A1* | 9/2015 | Hirabe | H01Q 3/02 343/894 |
| 2018/0343534 A1* | 11/2018 | Norris | H04S 7/303 |
| 2021/0058131 A1* | 2/2021 | Zhu | H04B 7/063 |
| 2021/0227400 A1* | 7/2021 | Jia | H04W 16/28 |
| 2022/0173793 A1 | 6/2022 | Byun et al. | |

FOREIGN PATENT DOCUMENTS

| | | |
|---|---|---|
| CN | 106209226 | 12/2016 |
| CN | 110661097 | 1/2020 |
| CN | 111313925 | 6/2020 |
| CN | 210745145 | 6/2020 |
| CN | 112218353 | 1/2021 |
| JP | 1999-355025 | 12/1999 |
| KR | 10-2008-0056358 | 6/2008 |
| KR | 10-2015-0033118 | 4/2015 |
| WO | 01/39320 | 5/2001 |
| WO | 2014/045495 | 3/2014 |
| WO | 2021/045430 | 3/2021 |

OTHER PUBLICATIONS

Search Report and Written Opinion issued Jun. 30, 2022 in counterpart International Patent Application No. PCT/KR2022/004638.

* cited by examiner

METHOD AND SYSTEM FOR MANAGING ORIENTATION OF CONSUMER PREMISE EQUIPMENT

CROSS-REFERENCE TO RELATED APPLICATIONS

This application is a continuation of International Application No. PCT/KR2022/004638 designating the United States, filed on Mar. 31, 2022, in the Korean Intellectual Property Receiving Office and claiming priority to Indian Provisional Patent Application No. 202141016354, filed on Apr. 7, 2021, in the Indian Patent Office and to Indian Complete Patent Application No. 202141016354, filed on Mar. 11, 2022, in the Indian Patent Office, the disclosures of all of which are incorporated by reference herein in their entireties.

FIELD

The disclosure relates to installation of network (NW) equipment (e.g., consumer premise equipment (CPE)) and, for example, to installation of NW equipment in customer premises.

DESCRIPTION OF RELATED ART

A customer premises equipment (CPE) may refer to a stationary mounted network (NW) device, where the CPE connects wirelessly to a fifth generation (5G) millimeter wave (mmW) cellular NW nodes (e.g., gNB) and to anchor long term evolution (LTE) cells (e.g., eNB). Based on the connection, the mmW cellular connections provide a high bandwidth data connection, but at the same time has challenges of sensitivity of mmW signal in a given channel condition. It is necessary to make sure alignment of the CPE is accurate to receive the best mmW signal and the CPE is paired with best possible beam pair (e.g., bore sight beam).

It is a challenge to make a proper mounting and installation of the CPE by an end user, without the need of installation engineer. It is a challenge to handle the need for re-installation of device, if either the place of installation changes or any channel conditions change.

FIG. 1 is an illustration (100) in which a millimeter wave antenna module is depicted, according to prior art. The mmW antenna modules includes an array of antennas, where the array of antennas includes 2 types of antennas such as dipole antennas and patch antennas. The patch antennas are directed transmission antennas (used for sharp directed beams) and dipole antennas are omni-directional Transmission antennas. horizontal and vertical polarization of antennas (H and V) are used for both patch and dipole and each antenna in an array has one H and one V polarized transmission.

FIG. 2 is an illustration (200) in which the millimeter wave antenna module versus the beams is depicted, according to prior art. The antennas in the array operating generate high transmit power, narrow and directed long beams. The more narrow the beam, more precision of direction needed. The above combination illustrates typical:

4 Patch Antennas forming 4H 4V sharper and longer beams,
2 Dipole Antennas forming 2H 2V moderate beams, and
1 Patch Antenna forming a 1H 1V wider beam FIG. 3 is an illustration (300) in which power class 1 on the CPE is depicted, according to prior art. The CPE with mmW antennas may, for example, include Power Class 1. On the CPE, all the mmW antenna modules (in an example, 4 mmW antenna modules in a CPE-indoor unit (IDU)) need to be placed together and all need to be active for achieving High Tx power. All 4 mmW antenna module being active together will achieve minimum 40 dbm EIRP. Since all mmW antenna modules are together, the device orientation is needed to make sure the antenna modules together are directed towards the best orientation.

The beams from the combined all 4 mmW modules do not cover the all the directions and manually need to make sure the direction of 4 mmW modules face a direction of a gNB. Further, varying channel conditions (any obstacle on line of sight between the CPE and the gNB) needs manual re-adjustment of CPE's position for better signal strength. In cases of CPE installation under non line of sight conditions, it is difficult to manually find best direction of mmW modules. It is therefore a challenge to manually install the CPE IDU at customer premises.

It is desired to address the above mentioned disadvantages or other shortcomings or at least provide a useful alternative.

SUMMARY

Embodiments of the disclosure provide methods and systems for installing or managing orientation of a CPE.

Embodiments of the disclosure control the orientation of the CPE by controlling a single motor or pair of motors mounted on a vertical pivot stand or a horizontal pivot stand. Embodiments of the disclosure identify current azimuth and zenith/altitude positions of motors/CPE and mapping vital modem parameters for a given set of azimuth and zenith positions, to position the CPE in the best possible position Embodiments of the disclosure achieve 1H1V antenna (low power antenna from array) by auto tuning of positioning of the CPE, through exchange of vital modem parameters, including end user throughput requirements and control messages between a control server/electronic device and CPE.

Embodiments of the disclosure collect vital modem parameters and send to the control server and receive the control message and decode control message to indicate the direction of motion of CPE and hence fix the best orientation of the CPE for best beam pair of 5G mmW antennas.

Embodiments of the disclosure provide auto and self-installation of CPE, with minimal/reduced or no end user intervention. The CPE, after power on, will follow the procedure to connect to the control server, either through its own LTE data or through another device's LTE data in vicinity.

Embodiments of the disclosure determine the orientation of the fixed wireless access for optimal radio frequency (RF) performance.

Embodiments of the disclosure auto install customer premise 5G end user equipment via self-orientation for best signal reception, to provide best/improved results even in non-line of sight conditions.

Embodiments of the disclosure determine a network side and an electronic device side beam connectivity for optimum orientation of the CPE.

Embodiments of the disclosure control the orientation of the CPE based on varying dynamic RF channel conditions.

Embodiments of the disclosure use a motor module to adjust position of the CPE, so that the best Antenna configurations such as 1H1V (wide beam) are selected, to apply low Tx power and reduce thermal impact. Embodiments of the disclosure run in conditions of Low Throughput requirements, where the position may be adjusted accordingly to apply low power. Embodiments of the disclosure provide re-adjustment of position/direction that will run intermittently on device and set the best position again in the event of change of place of the CPE and also if any change in the channel conditions.

Accordingly, according to example embodiments, methods for managing orientation of a CPE are provided. The method includes: detecting, by the consumer premise equipment (CPE), that the CPE is in a first orientation and connected to at least one first beam of at least one of a network element and an electronic device; determining, by the CPE, at least one of a change in temperature of the CPE and a data rate requirement of the CPE; identifying, by the CPE, a second orientation of at least one second beam of at least one of the network element and the electronic device to control the determined change in the temperature of the CPE and the determined data rate requirement; and changing, by the CPE, the CPE to the second orientation for connecting to the at least one second beam. Accordingly, various example embodiments herein provide a system for managing an orientation of a consumer premise equipment (CPE). The system includes: a mounting pivot, at least one motor module including at least one electric motor. The at least one electric motor is placed between the mounting pivot and the CPE. The at least one motor module and at least one control module are included in the CPE, wherein the at least one control module and the at least one motor module are configured to position the CPE to receive at least one beam at an angle and a direction of rotation.

According to various example embodiments, the control module is configured to send a request comprising a current angular position of the CPE to the motor module; and the motor module is configured to: receive the request and send a current position comprising at least one of an azimuth angle and a zenith angle to the control module based on the request. The control module is configured to: receive the current position comprising at least one of the azimuth angle and the zenith angle from the motor module, obtain at least one of a modem radio frequency (RF) parameter, determine a position of the CPE based on the at least one of the modem RF parameter and the current position comprising at least one of the azimuth angle and the zenith angle, determine that a position of the CPE is not same as the current angular position, and send an angular position command comprising a new position of the CPE to the motor module. The motor module is configured to: receive the angular position command comprising the new position from the control module and set the position of the CPE based on the angular position command comprising the new position Accordingly, example embodiments herein provide methods for managing orientation of a CPE. The method includes: authenticating, by an electronic device, the consumer premise equipment (CPE) and establishing, by the electronic device, a connection between the CPE and the electronic device; sending, by the electronic device, a command to receive a signal strength of the CPE and receiving, by the electronic device, a response comprising the signal strength of the CPE based on the command; and managing, by the electronic device, orientation of the CPE based on the response.

Accordingly, example embodiments herein provide an electronic device for managing orientation of a consumer premise equipment (CPE). The electronic device includes: a CPE orientation managing controller coupled with a processor and a memory. Further, the CPE orientation managing controller is configured to: authenticate the CPE and establish a connection between the CPE and the electronic device; send a command to receive a signal strength of the CPE; and receive a response comprising the signal strength of the CPE based on the command and manage orientation of the CPE based on the response.

These and other aspects of the various example embodiments herein will be better appreciated and understood when considered in conjunction with the following description and the accompanying drawings. It should be understood, however, that the following descriptions, while indicating at least one example embodiment and numerous details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

The embodiments disclosed herein are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

Figure 1:
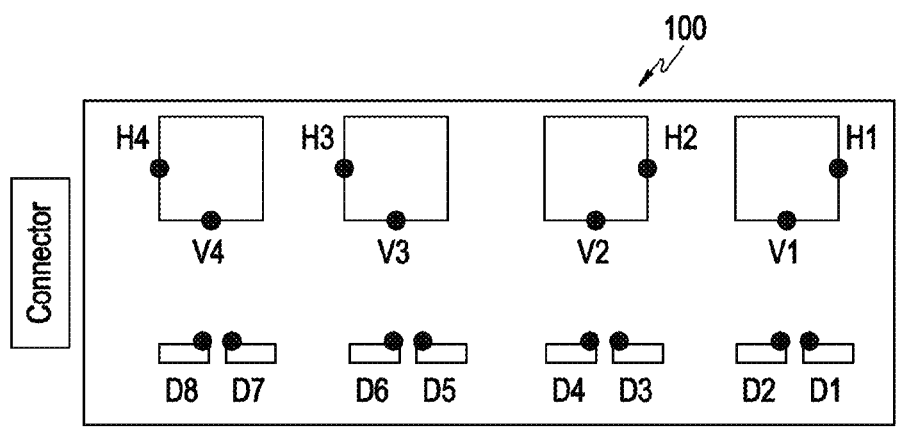
FIG. 1 is a diagram illustrating an example in which a millimeter wave antenna module is depicted, according to prior art.
Figure 2:
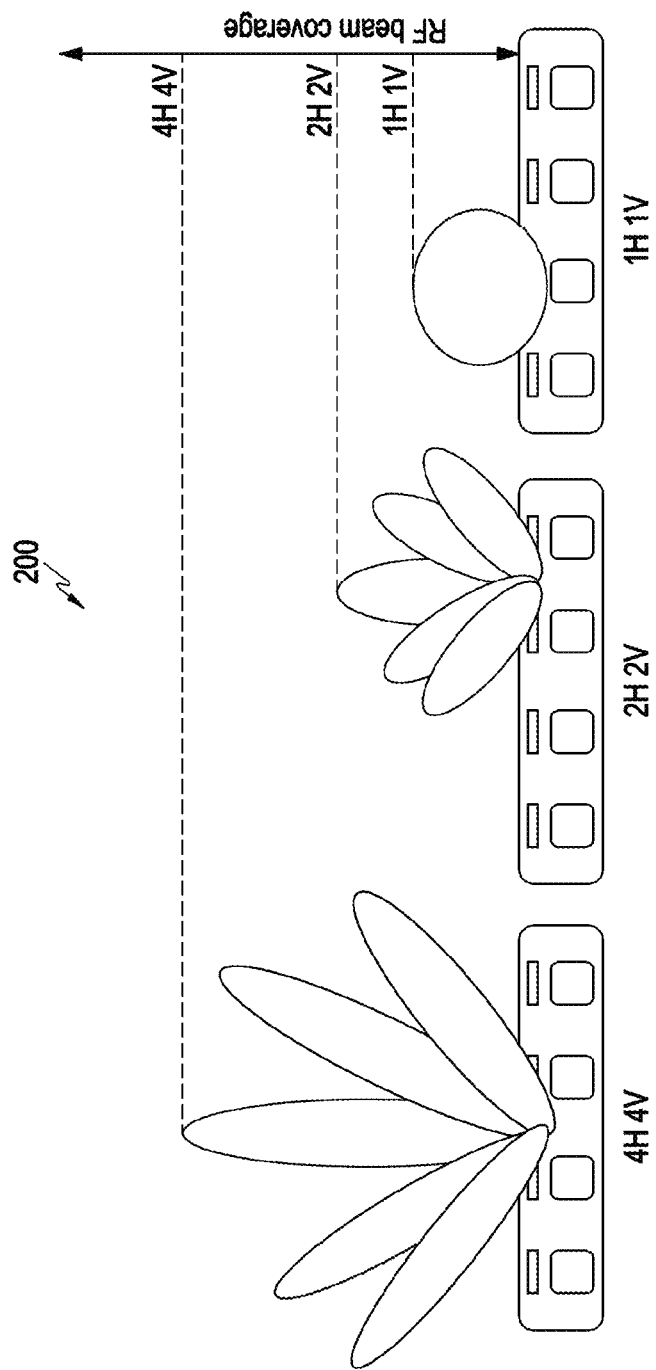
FIG. 2 is a diagram illustrating an example in which the millimeter wave antenna module versus the beams is depicted, according to prior art.
Figure 3:
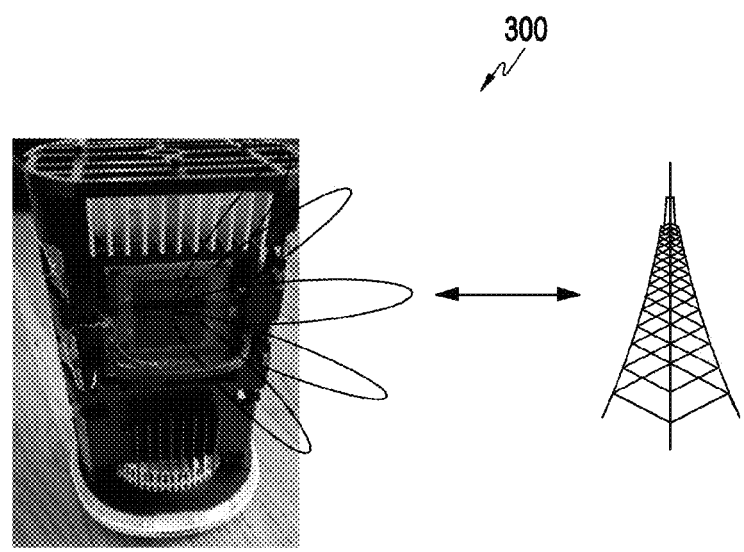
FIG. 3 is a diagram illustrating an example in which power class 1 is depicted, according to prior art.

The various example embodiments herein and the various features and advantageous details thereof are explained more fully with reference to the non-limiting embodiments that are illustrated in the accompanying drawings and detailed in the following description. Descriptions of well-known components and processing techniques may be omitted to not unnecessarily obscure the disclosure. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for managing orientation of a CPE. The method includes: detecting, by the CPE, that the CPE is in a first orientation and connected to at least one first beam of at least one of a network element and an electronic device. Further, the method includes detecting, by the CPE, a requirement for connecting to at least one second beam of at least one of the base station and the electronic device. Further, the method includes causing, by the CPE, the CPE to automatically change to a second orientation for connecting to the at least one second beam.

The disclosed method may be used to control the orientation of the CPE device by controlling, for example, a single motor or pair of motors mounted on a vertical pivot stand or a horizontal pivot stand. The disclosed method may be used to identify current azimuth and zenith/altitude positions of motors/CPE and mapping vital modem parameters for a given set of azimuth and zenith positions, to position the CPE in the best possible position. The disclosed method may be used to achieve 1H1V antenna (Low power antenna from array) by auto tuning of positioning of the CPE, through exchange of vital modem parameters, including end user throughput requirements and control messages between a control server/electronic device and CPE.

The disclosed method may be used to collect vital modem parameters and send to the control server and receive the control message and decode control message to indicate the direction of motion of CPE and hence fix the best orientation of the CPE for best beam pair of 5G mmW antennas.

The disclosed method may be used to auto and self-installation of CPE, with minimal/reduced or no end user intervention. The CPE, after power on, will follow the procedure to connect to the control server, either through its own LTE data or through another device's LTE data in vicinity.

The disclosed method may be used to determine the orientation of the fixed wireless access for optimal radio frequency (RF) performance. The disclosed method may be used to auto installing customer premise 5G end user equipment via self-orientation for best signal reception, to provide best results even including non-line of sight conditions.

The disclosed method may be used to use the motor module to adjust position of the CPE, so that the best Antenna configurations such as 1H1V (wide beam) are selected, to apply low Tx Power and reduce Thermal impact. The disclosed method is to run in conditions of Low Throughput requirements, where the position may be adjusted accordingly to apply low power. The method for re-adjustment of position/direction will run intermittently on device and set the best position again in the event of change of place of the CPE and also if any change in the channel conditions.

Referring now to the drawings, and more particularly to FIGS. 4 through 26, where similar reference characters denote corresponding features consistently throughout the figures, there are shown various example embodiments.

Figure 4:
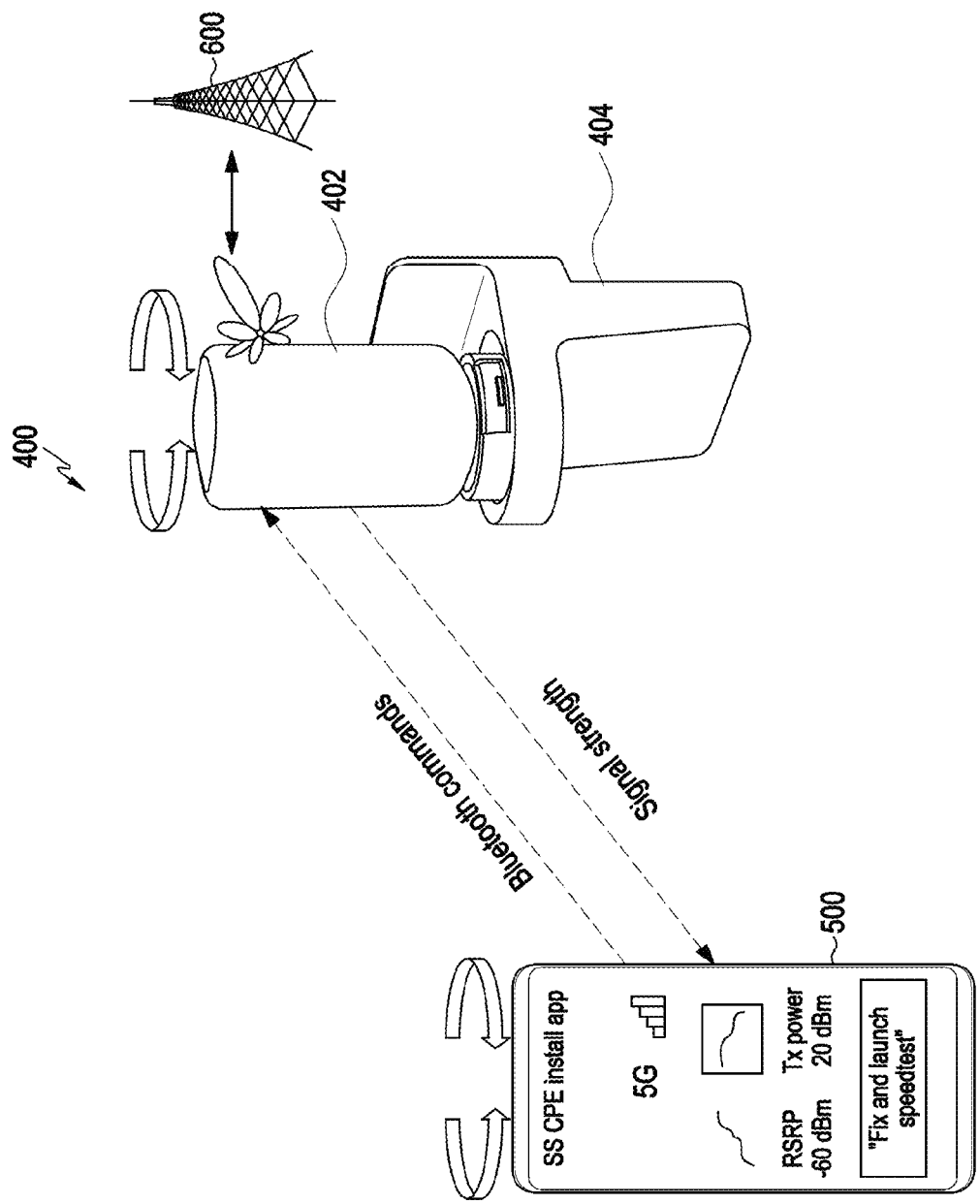
FIG. 4 is a diagram illustrating an example in which a system manages orientation of a CPE, according to various embodiments.
Figure 5:
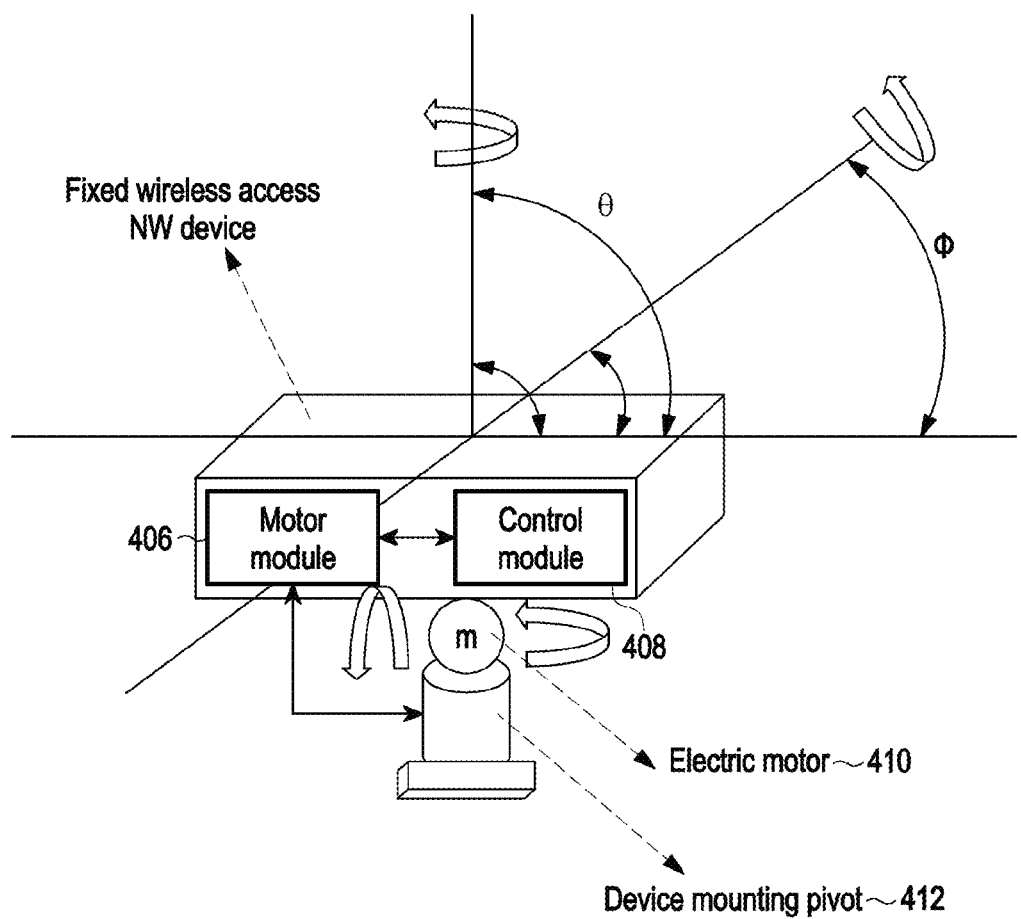
FIG. 5 is a diagram illustrating an example arrangement of a control module and a motor module in the CPE, according to various embodiments.

FIG. 4 is a diagram illustrating an example system (400) that manages orientation of the CPE, according to various embodiments. In an embodiment, the system (400) includes a CPE (402) and an electronic device (500). The operations and functions of the electronic device (500) are explained in greater detail below with reference to FIG. 24. The CPE (402) may communicated with the electronic device (500) and a network element (600) (e.g. including a base station) over a wireless medium. The CPE (402) is provided with a base (404), and referring to FIG. 5, is provided one or more motor module (406), one or more control module (408), one or more electric motor (410), a mounting pivot (412), and referring to FIG. 9, a power supply part (414), a USB port (416) (e.g., B-type USB port), and referring to FIG. 11 a θ rotation control structure (420), and referring to FIG. 12, a gear (422), and referring to FIG. 13, an internal base (424).

The one or more electric motor (410) may be placed between the mounting pivot (412) and the CPE (402). The mounting pivot (412) may be a vertical mounting pivot and a horizontal mounting pivot. The one or more control module (408) and the one or more motor module (406) is configured to position the CPE (402) to receive beam at an angle and a direction of rotation.

Figure 17:
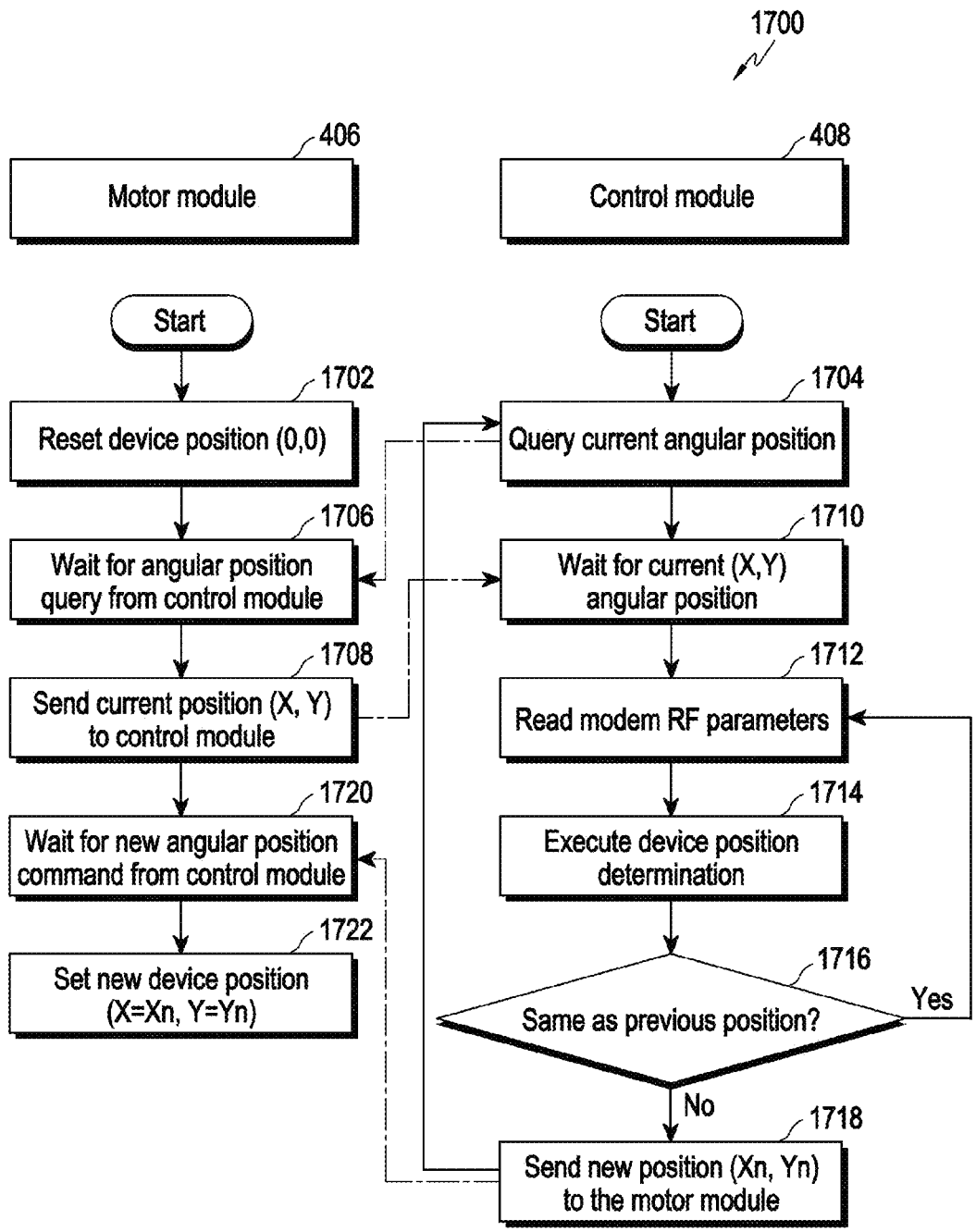
FIG. 17 is a flowchart illustrating example operations of the control module and the motor module, according to various embodiments.

In an embodiment, (as shown in FIG. 17), the control module (408) is configured to send a request comprising a current angular position of the CPE (402) to the motor module (406). The motor module (406) is configured to receive the request and send a current position comprising an azimuth angle and a zenith angle to the control module (408) based on the request. In an embodiment, the azimuth angle may be changed by determining that a current reference signal receive power (RSRP) does not meet a predefined (e.g., specified) threshold, changing an azimuth angle position by a first single step of the rotation of the motor module (406), obtaining a new RSRP, determining that the new RSRP is greater than the current RSRP and changing an azimuth angle position by a second single step of the rotation of the motor module (406).

In an embodiment, the zenith angle may be changed by determining that a current RSRP does not meet a predefined (e.g., specified) threshold, changing a zenith angle position by a first single step of the rotation of the motor module (406), obtaining a new RSRP, determining that the new RSRP is greater than the current RSRP, and changing a zenith angle position by a second single step of the rotation of the motor module (406).

The control module (408) may include various circuitry and is configured to receive the current position comprising the azimuth angle and the zenith angle from the motor module (406) and obtain a modem RF parameter. Further, the control module (408) is configured to determine a position of the CPE (402) based on the modem RF parameter and the current position comprising the azimuth angle and the zenith angle. Further, the control module (408) is configured to determine that a position of the CPE (402) is not same as the current angular position and send an angular position command comprising a new position of the CPE (402) to the motor module (406). The motor module (406) is configured to receive the angular position command comprising the new position from the control module (408) and set the position of the CPE (402) based on the angular position command comprising the new position.

In an embodiment, the control module (408) and the motor module (406) are configured to position the CPE (402) to receive the beam at an angle and a direction of rotation by authenticating the CPE (402) by the electronic device (500), establishing a connection between the CPE (402) and the electronic device (500) by the electronic device (500), sending a command to receive a signal strength of the CPE (402) by the electronic device (500), receiving a response comprising the signal strength of the CPE (402) based on the command by the electronic device (500) and causing to manage orientation of the CPE (402) based on the response by the electronic device (500).

Further, the control module (408) is configured to monitor the orientation of the CPE (402) over a period of time using a machine learning module (e.g., including various processing circuitry and/or executable program instructions) based on a usage pattern and store the orientation of the CPE (402). Further, the control module (408) is configured to automatically apply the orientation of the CPE (402) using the machine learning module (using the electronic device (500)).

FIG. 5 is a diagram illustrating an example arrangement of the control module (e.g., including control circuitry) (408) and a motor module (e.g., including a motor) (406) in the CPE (402), according to various embodiments. In an embodiment, as shown in FIG. 5, the electric motor (410) is embedded in the mounting pivot (412).

Figure 6:
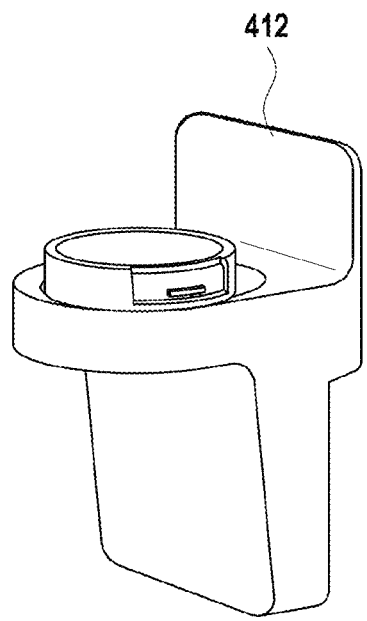
FIG. 6 is a diagram illustrating an example pivot mount with embedded motor, according to various embodiments.
Figure 7:
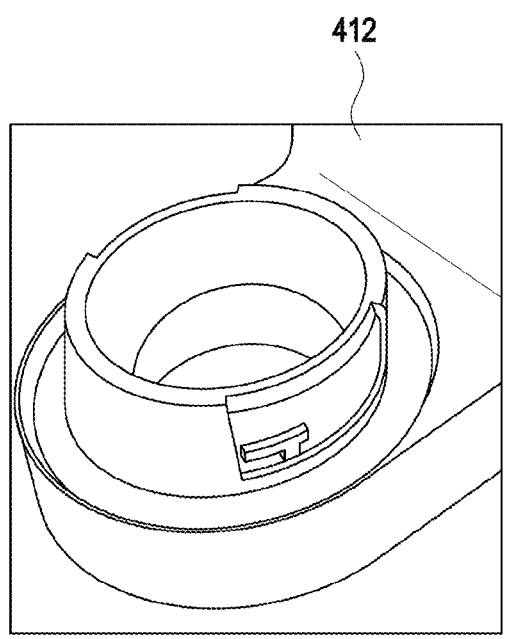
FIG. 7 is a top perspective view of the pivot mount, according to various embodiments.
Figure 8:
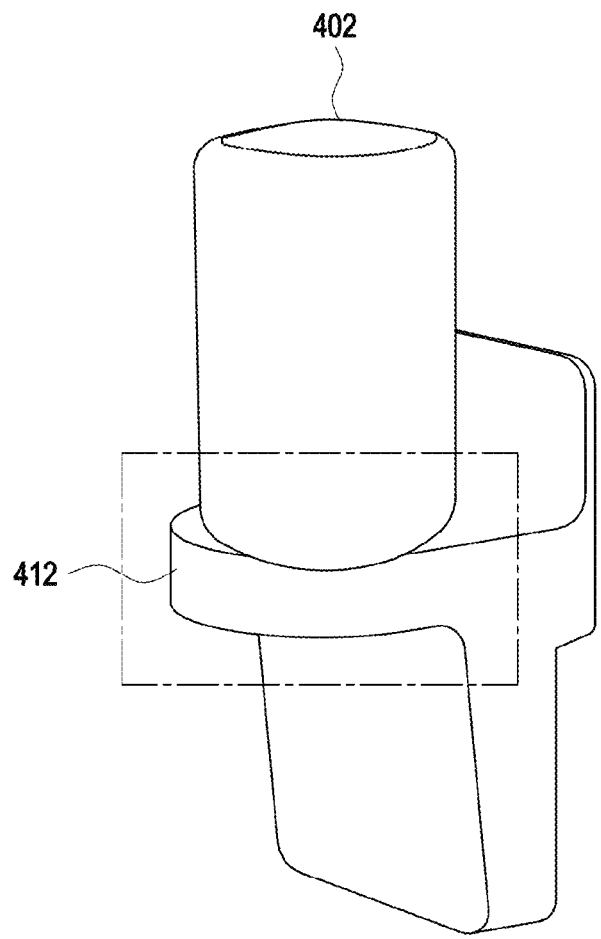
FIG. 8 is a diagram illustrating an example of the pivot mount and a bottom of the CPE providing enough space for positioning stepper motor(s), according to various embodiments.
Figure 9:
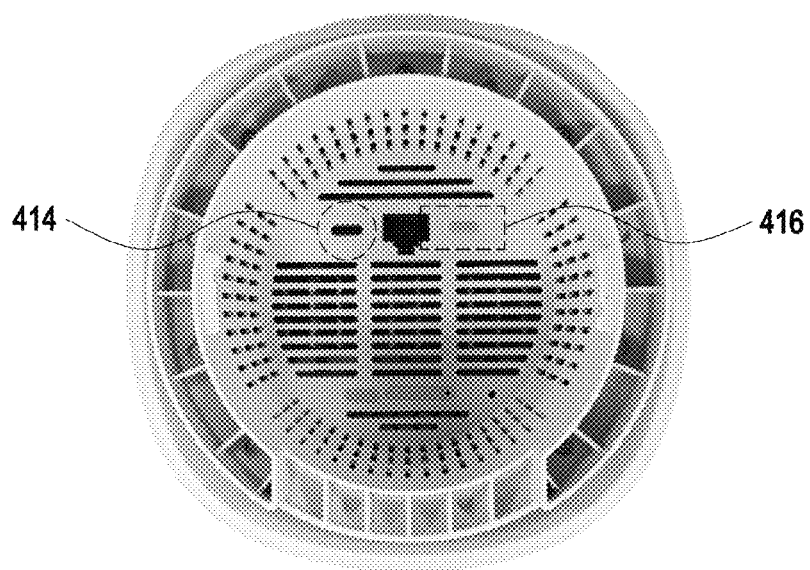
FIG. 9 is a photograph illustrating a bottom view of the CPE, according to various embodiments.

FIG. 6 is a perspective view of an example pivot mount (412) with embedded motor, according to various embodiments. A top perspective view of the pivot mount (412) is illustrated in FIG. 7. FIG. 8 is a perspective view illustrating the pivot mount (412) and a bottom of the CPE (402) providing sufficient space for positioning stepper motor(s), according to various embodiments. FIG. 9 is a bottom view of the CPE (402) according to various embodiments. As shown in FIG. 9, the power supply (414) is provided to the CPE (402) and the electric motor (410) using a port (e.g., USB port) according to various embodiments.

Figure 10:
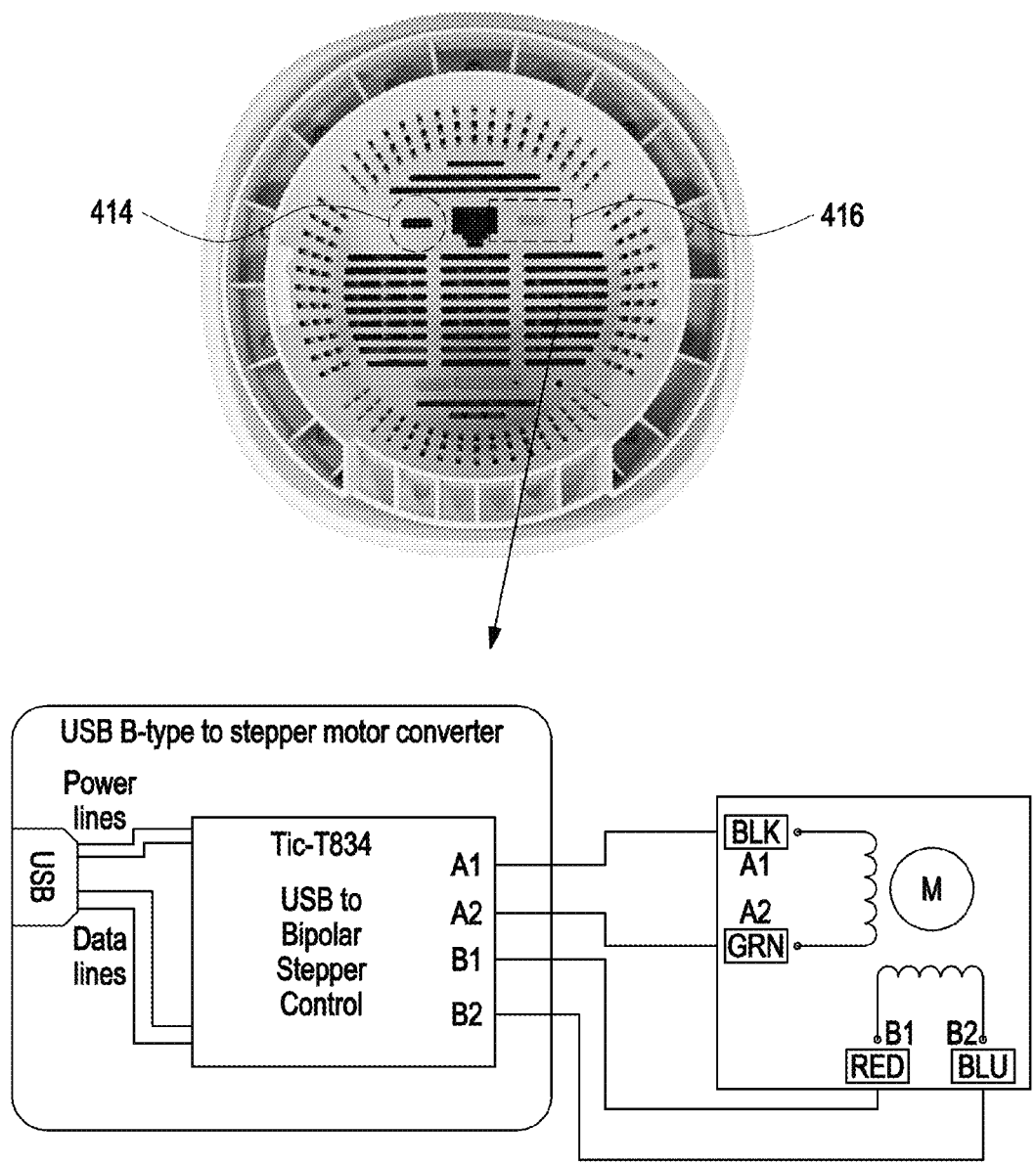
FIG. 10 is diagram illustrating an example stepper motor control circuit, according to various embodiments.

FIG. 10 is a diagram illustrating an example stepper motor control circuit, according to various embodiments. The connection block diagram illustrates an example stepper motor control with bipolar stepper motor driver integrated circuit (IC).

Figure 11:
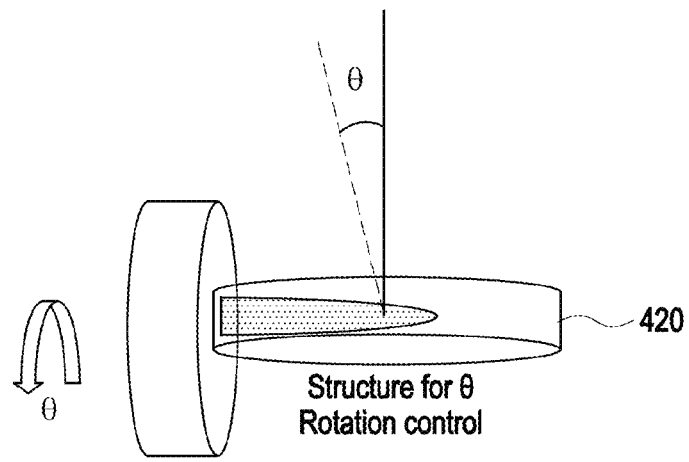
FIGS. 11, 12, 13, 14, 15 and 16 are diagrams illustrating example hardware structure of the motor module, according to various embodiments.
Figure 12:
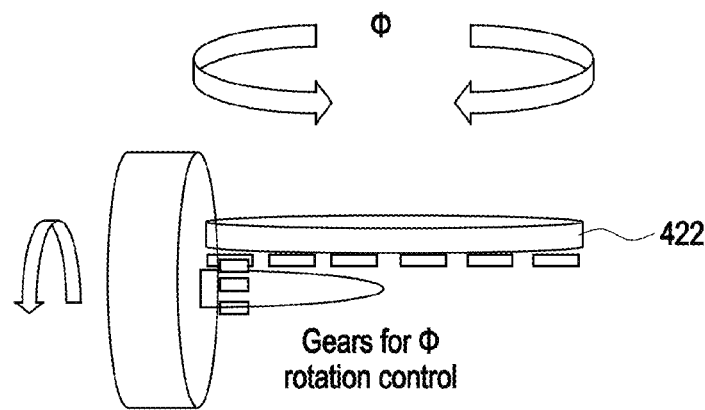
Figure 13:
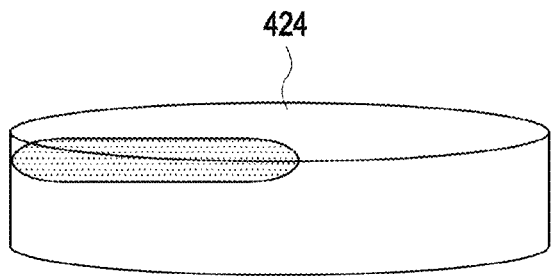
Figure 14:
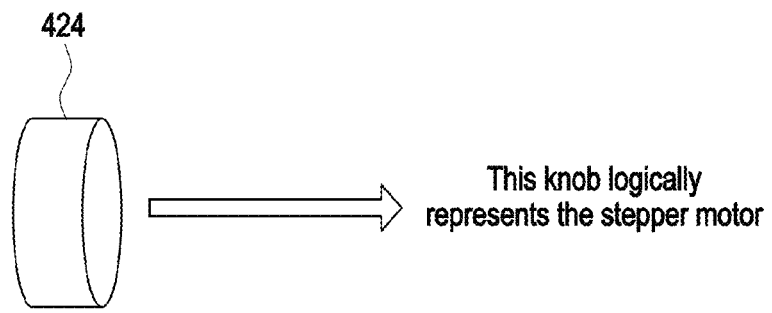
Figure 15:
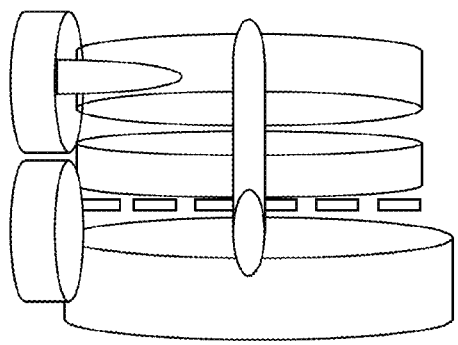
Figure 16:
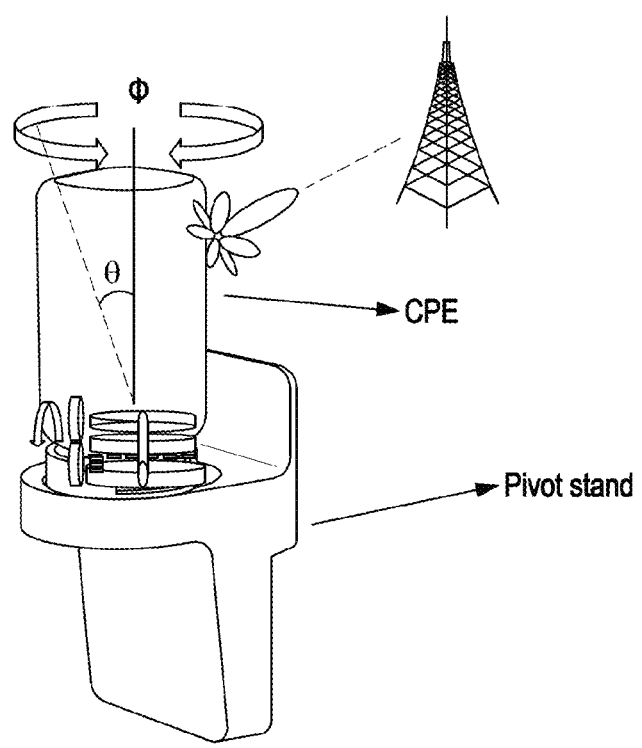

FIGS. 11, 12, 13, 14, 15 and 16 are diagrams illustrating example hardware structure of the motor module, according to various embodiments. A structure (420) for θ rotation control is depicted in FIG. 11. As shown in FIG. 12, a gear (422) is used for controlling rotation of the electric motor (410). An internal base (424) is depicted in FIG. 13. Referring to FIG. 14, a knob logically represents the stepper motor. As shown in FIG. 16, the CPE (402) is placed above the pivot stand (412) and internal components (as shown in FIG. 15).

FIG. 17 is a flowchart (1700) illustrating example operations of the control module (408) and the motor module (406), according to various embodiments. At 1702, the motor module (406) resets CPE position (0, 0). At 1704, the control module (408) is configured to send a request for a current angular position of the CPE (402) to the motor module (406). At 1706 and 1708, the motor module (406) is configured to receive the request and send a current position including the azimuth angle and the zenith angle to the control module (408) based on the request. At 1710, the control module (408) is configured to receive the current position including the azimuth angle and the zenith angle from the motor module (406).

At 1712, the control module (408) is configured to obtain the modem RF parameter. At 1714, the control module (408) is configured to determine a position of the CPE (402) based on the modem RF parameter and the current position including the azimuth angle and the zenith angle (refer to FIGS. 18 and 19). At 1716, the control module (408) is configured to determine whether the position of the CPE (402) is the same as the current angular position. Upon determining that the position of the CPE (402) is not same as the current angular position (No in 1716), at 1718, the control module (408) is configured to send the angular position command comprising the new position of the CPE (402) to the motor module (406). Upon determining that the position of the CPE (402) is same as the current angular position (Yes in 1716), the control module (408) performs the operations of 1712.

At 1720, the motor module (406) is configured to receive the angular position command including the new position from the control module (408). At 1722, the motor module (406) is configured to set the position of the CPE (402) based on the angular position command comprising the new position.

Figure 18:
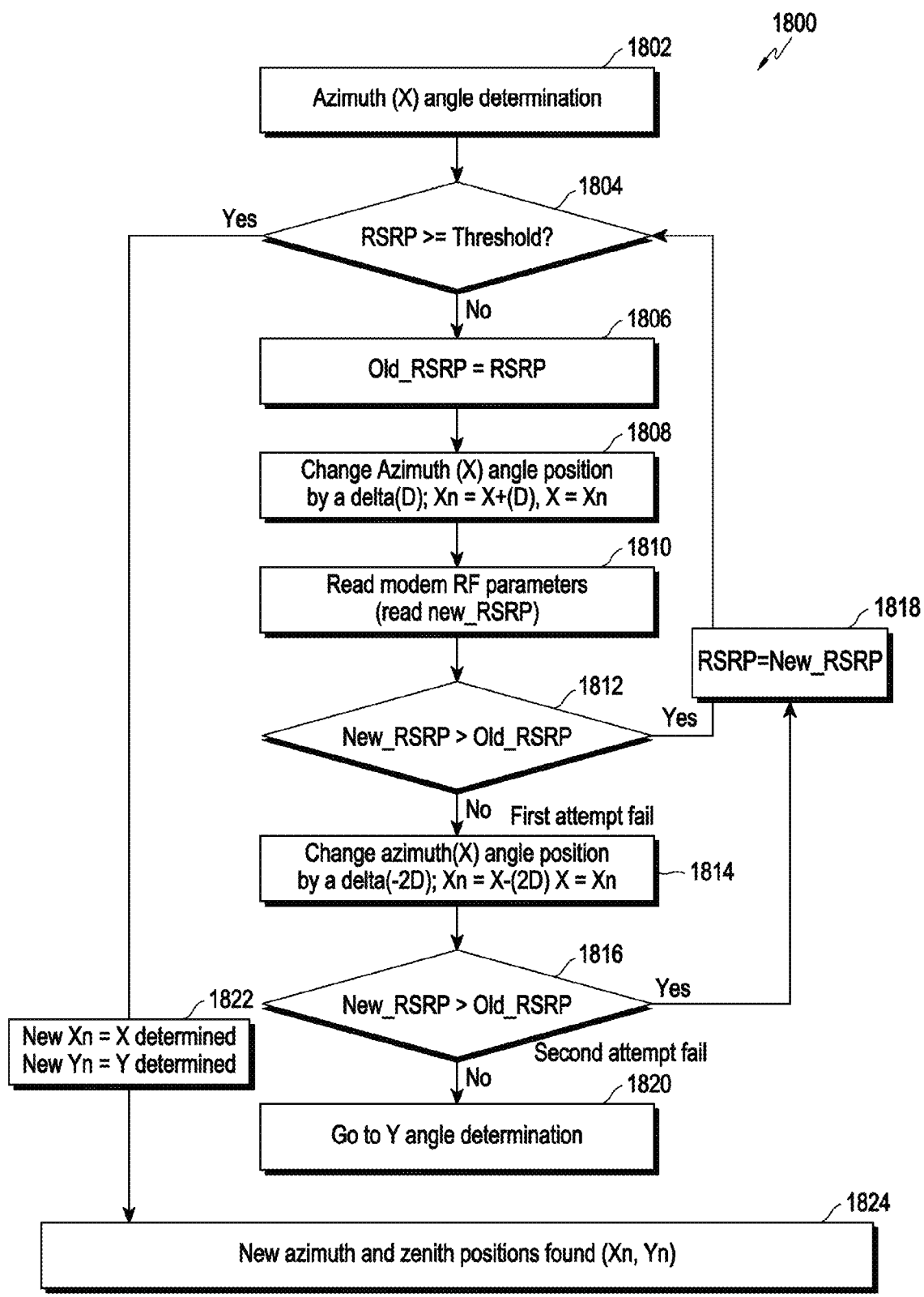
FIG. 18 and FIG. 19 are flowcharts illustrating example operations of a device position determination with reference to FIG. 17, according to various embodiments.
Figure 19:
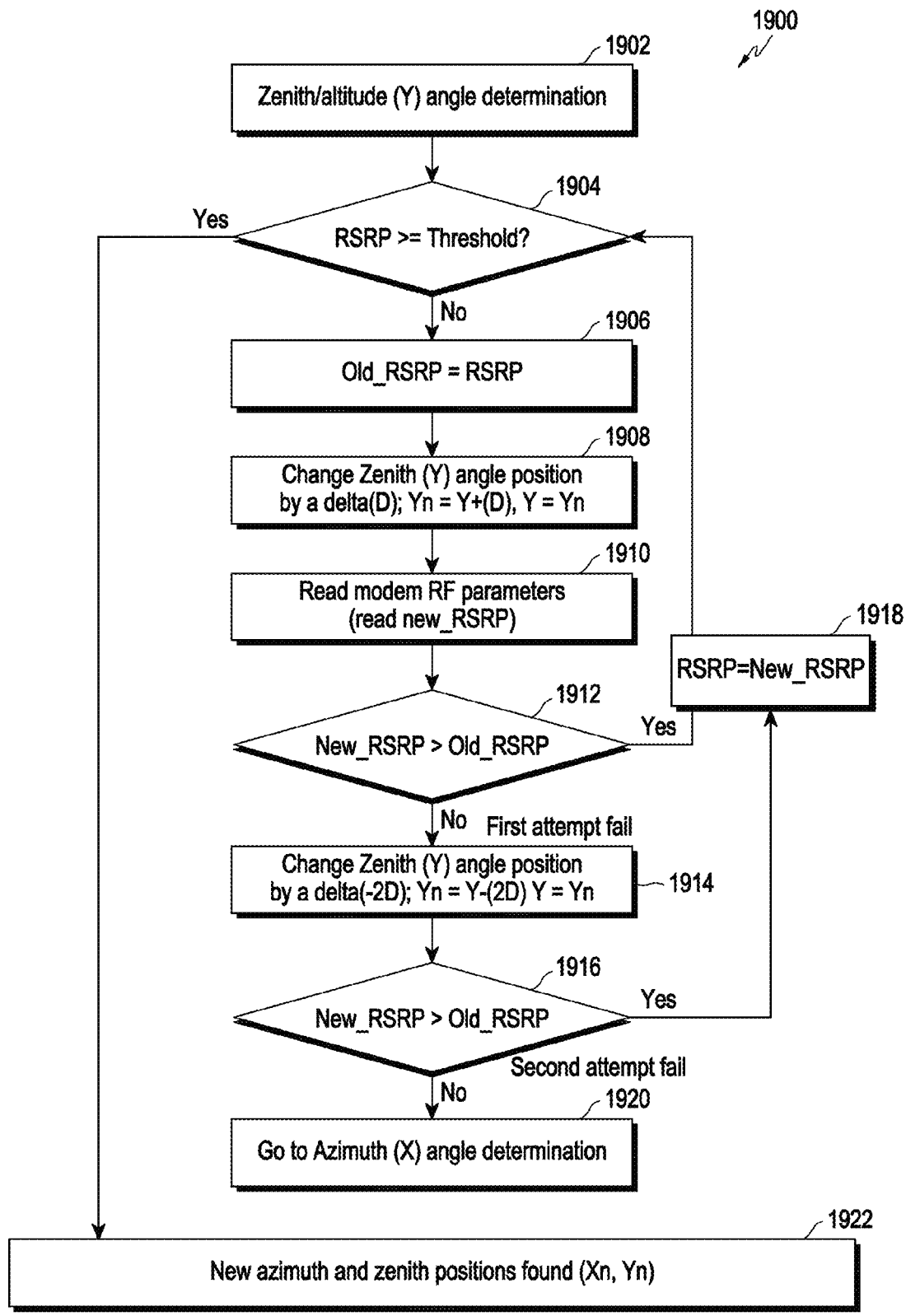

FIG. 18 and FIG. 19 are flowcharts (1800 and 1900) illustrating example operations of a device position determination in connection with FIG. 17, according to various embodiments.

Referring to FIG. 18, the operations (1802-1824) are performed by the control module (408). At 1802, the control module (408) determines the azimuth (X) angle. At 1804, the control module (408) determines whether the RSRP is greater than or equal to predefined (e.g., specified) threshold. The threshold value may refer, for example, to an RSRP value above which, the signal coverage of the device is considered to be good (e.g., −80 dBm) and the RSRP value of −105 dBm and below may be considered to be poor coverage. The RSRP is an RF parameter that determines the RF signal coverage of the device.

Upon determining that the RSRP is not greater than or equal to the threshold (No in 1804) then, at 1806, the control module (408) determines that the previous RSRP is equal to the current RSRP. At 1808, the control module (408) changes the azimuth (X) angle position by a delta (D), where $X_n = X + (D)$ and $X = X_n$. Delta(D) may refer, for example, to resolution of the single step of the rotation of motor.

At 1810, the control module (408) reads the modem RF parameters (by reading New_RSRP). At 1812, the control module (408) determines whether New_RSRP is greater than Old_RSRP. If the New_RSRP is not greater than Old_RSRP (No in 1812) then, at 1814, the control module (408) changes azimuth(X) angle position by a delta(–2D), where Xn=X–(2D) and X=Xn. If the New_RSRP is greater than Old_RSRP (Yes in 1812) then, the control module (408) performs the operation of 1804.

At 1816, the control module (408) determines whether New_RSRP is greater than Old_RSRP. If the New_RSRP is greater than Old_RSRP (Yes in 1816) then, at 1818, the control module (408) determines that RSRP is equal to new_RSRP. If the New_RSRP is not greater than Old_RSRP (No in 1816) then, at 1820, the control module (408) performs the Y angle determination. At 1822, the control module (408) determines the new azimuth and zenith positions (Xn, Yn). Upon determining that the RSRP is greater than or equal to the predefined threshold then, at 1822, the control module (408) determines the new azimuth and zenith positions (Xn, Yn).

Referring to FIG. 19, the operations (1902-1922) are performed by the control module (408). At 1902, the control module (408) determines the zenith/altitude (Y) angle. At 1904, the control module (408) determines whether the RSRP is greater than or equal to predefined (e.g., specified) threshold. The threshold value may refer, for example, to an RSRP value above which, the signal coverage of the device may be considered to be good (e.g., –80 dBm) and the RSRP value of –105 dBm and below may be considered to be poor coverage. The RSRP is an RF parameter that determines the RF signal coverage of the device.

Upon determining that the RSRP is not greater than or equal to the predefined threshold (No in 1904) then, at 1906, the control module (408) determines that the previous RSRP is equal to the current RSRP. At 1908, the control module (408) changes the zenith/altitude (Y) angle position by a delta (D), where Xn=X+(D) and X=Xn. Delta(D) is resolution of the single step of the rotation of motor.

At 1910, the control module (408) reads the modem RF parameters (by reading New_RSRP). At 1912, the control module (408) determines whether New_RSRP is greater than Old_RSRP. If the New_RSRP is not greater than Old_RSRP (No in 1912) then, at 1914, the control module (408) changes zenith/altitude (Y) angle position by a delta (–2D), where Xn=X–(2D) and X=Xn. If the New_RSRP is greater than Old_RSRP (Yes in 1912) then, the control module (408) performs the operation of 1904.

At 1916, the control module (408) determines whether New_RSRP is greater than Old_RSRP. If the New_RSRP is greater than Old_RSRP (Yes in 1916) then, at 1918, the control module (408) determines that RSRP is equal to new_RSRP. If the New_RSRP is not greater than Old_RSRP (No in 1916) then, at 1920, the control module (408) performs the X angle determination. At 1922, the control module (408) determines the new azimuth and zenith positions (Xn, Yn). Upon determining that the RSRP is greater than or equal to the predefined threshold then, at 1922, the control module (408) determines the new azimuth and zenith positions (Xn, Yn).

FIGS. 20A, 20B, 20C and 20D are diagrams illustrating values of RSRP and angle (D) to explain the angle determination technique, according to various embodiments.

Figure 20A:
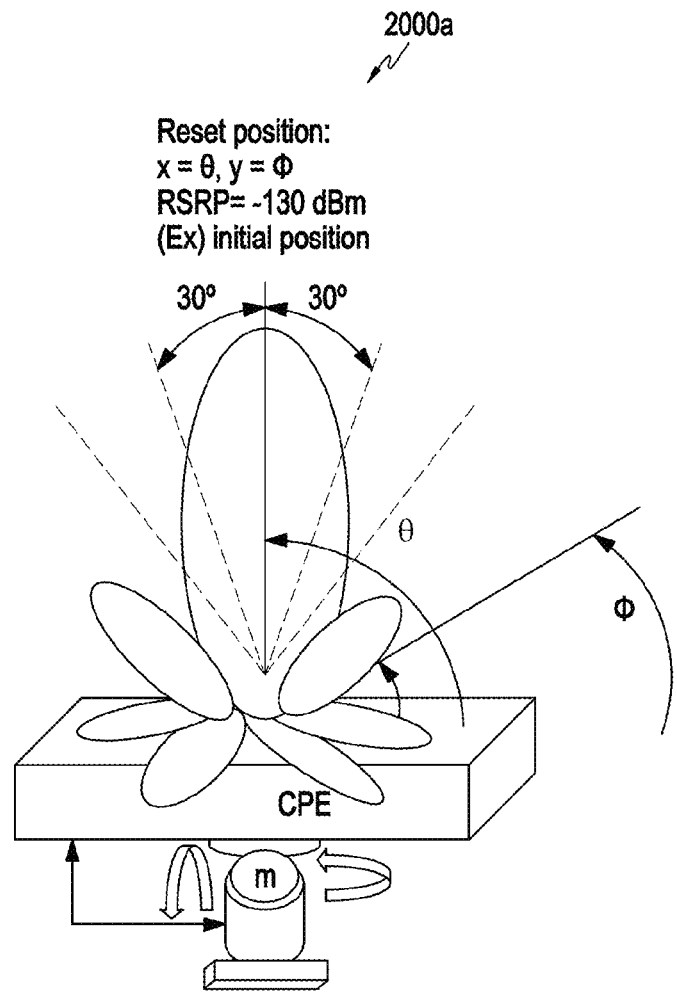
FIGS. 20A, 20B, 20C and 20D are diagrams illustrating examples in which values of RSRP and angle (D) are used to explain the angle determination technique, according to various embodiments.
Figure 20B:
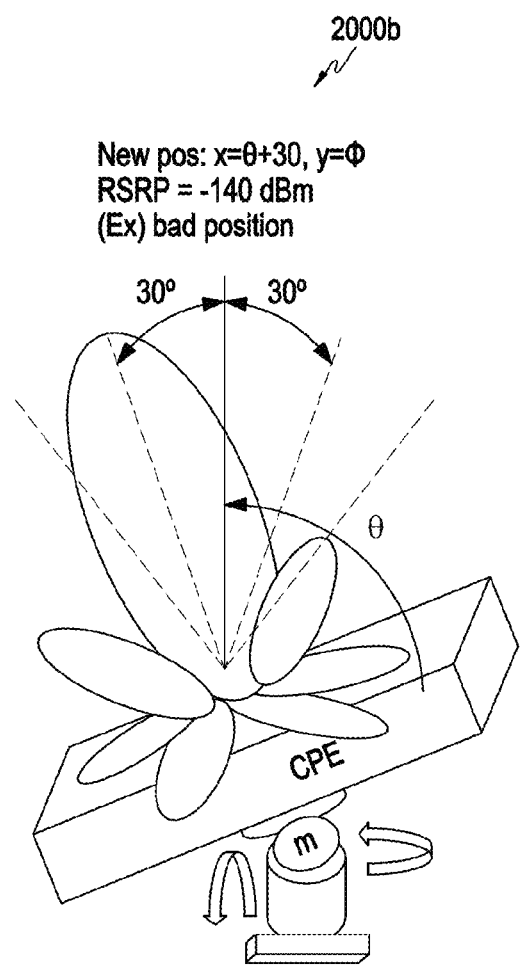
Figure 20C:
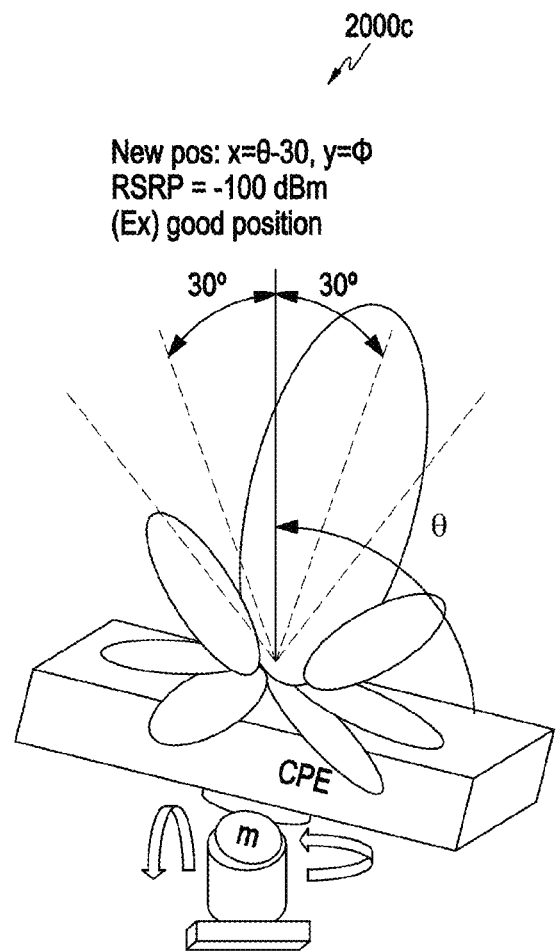
Figure 20D:
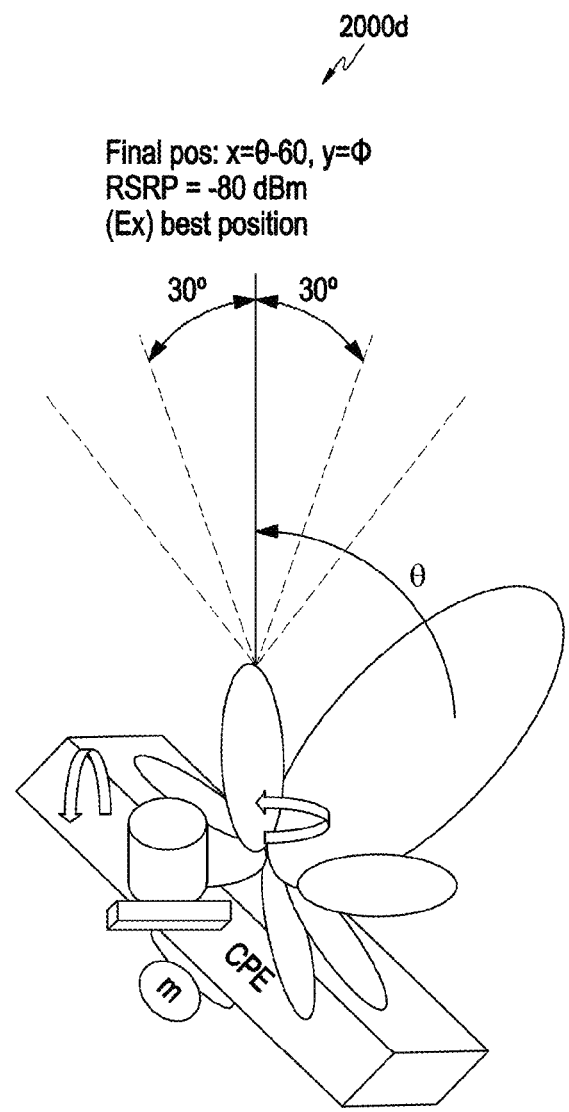

As shown in FIG. 20A, the reset position is x=θ, y=Φ and RSRP=–130 dBm, so it is considered as an initial position. As shown in FIG. 20B, the new position is x=θ+30, y=Φ and RSRP=–140 dBm, so it is considered as a bad position. As shown in FIG. 20C, the reset position is x=x=θ–30, y=Φ, and RSRP=–100 dBm, so it is considered as a good position. As shown in FIG. 20d, the reset position is x=θ–60, y=Φ and RSRP=–80 dBm, so it is considered as a best position.

Figure 21:
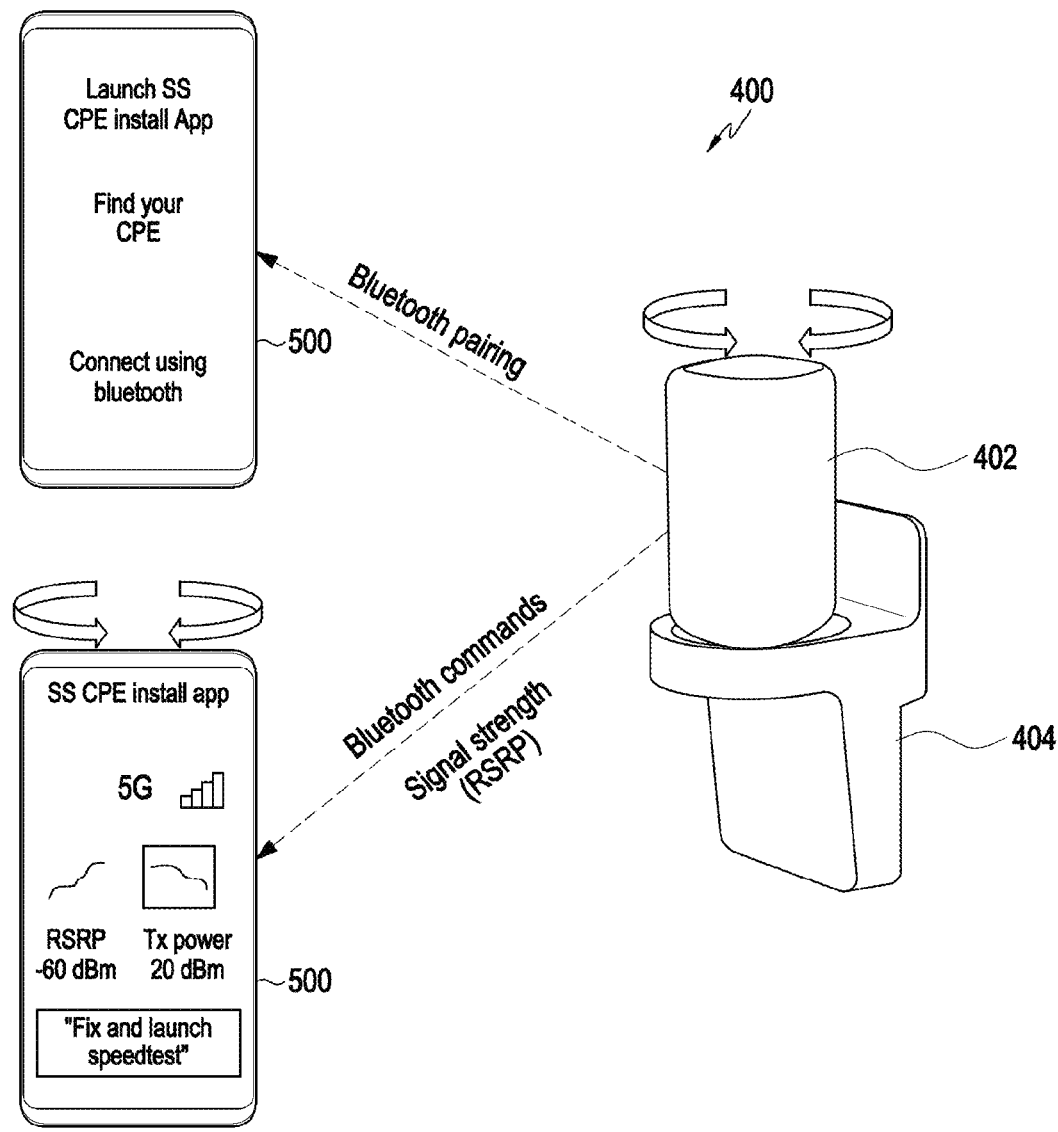
FIG. 21 is a diagram illustrating an example in which a system for manages orientation of the CPE, according to various embodiments.

FIG. 21 is a diagram illustrating an example in which a system (400) for manages orientation of the CPE (402), according to various embodiments. The electronic device (500) authenticates the CPE (402) and establishes the connection (e.g., Bluetooth connection or the like) between the CPE (402) and the electronic device (500). After establishing the connection, the electronic device (500) sends the command (e.g., Bluetooth command or the like) to receive a signal strength of the CPE (402). Based on the command, the electronic device (500) receives the response comprising the signal strength of the CPE (402). Based on the response, the electronic device (500) manages orientation of the CPE (402) by performing at least one of driving the motor module (406) to rotate the CPE (402) to the orientation, driving a control module (408) to rotate at least one antenna module of the CPE (402) to the orientation, and driving the motor module (406) and the control module (408) to the orientation.

Figure 22:
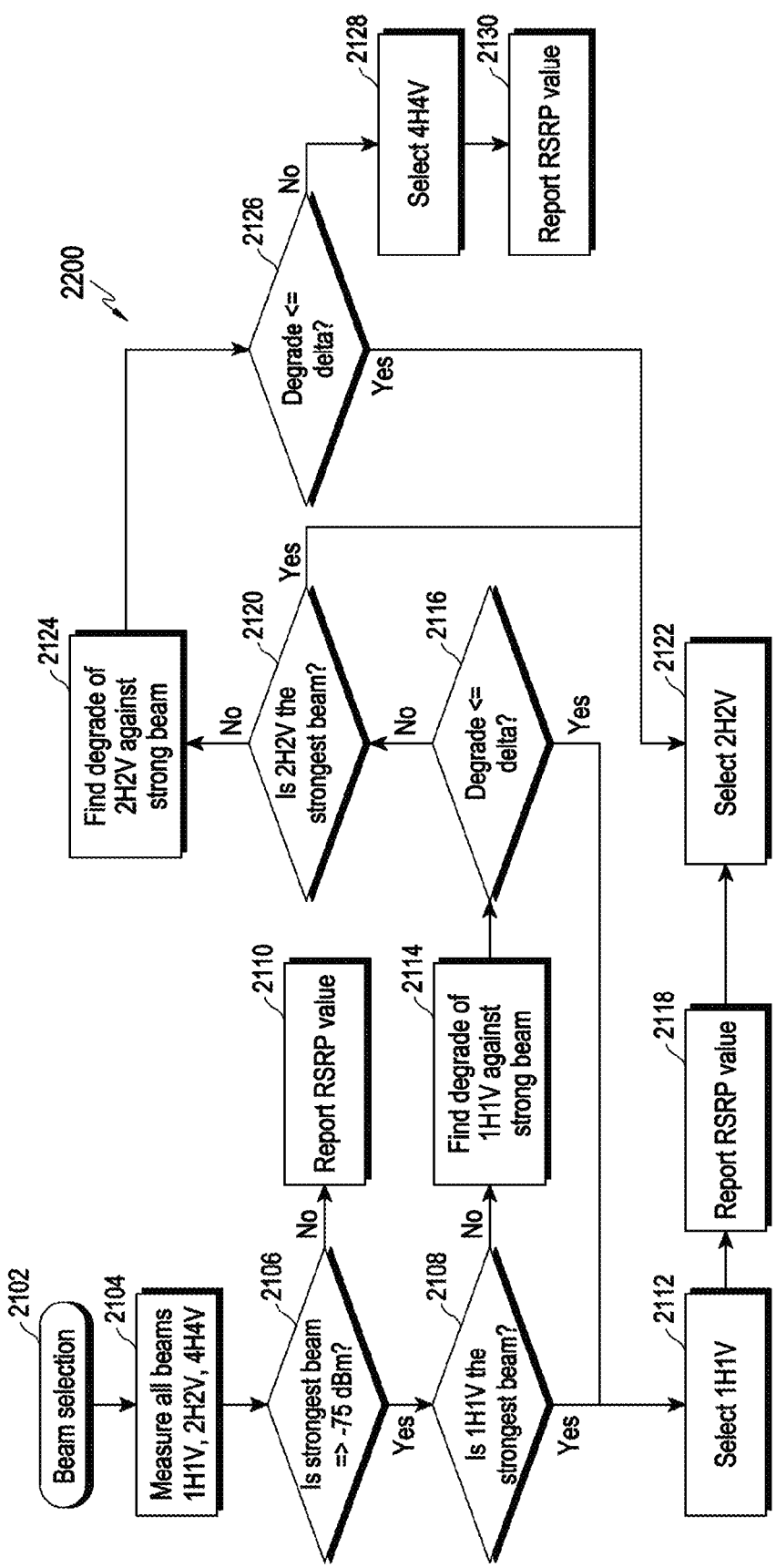
FIG. 22 is a flowchart illustrating an example method for prioritizing and choosing a beam that uses lesser number of antenna elements, according to various embodiments.

FIG. 22 is a flowchart illustrating an example method for prioritizing and choosing a beam that uses lesser number of antenna elements, according to various embodiments. The configuration item 'Degrade Delta' will be applied. The method prioritizes the choice of antennas in the order of 1H1V (wider and low power), 2H2V (moderate beam and moderate power) and 4H4V (sharper beam and high power). The method will note the strongest beam selected by default beam selection algorithm and shifts to wider beam selection and reads the resultant RSRP and if 'Degrade Delta' is in configured acceptable range, then stays on 1H1V selection. If Degrade Delta crosses the configured acceptable range, then attempts for selection of Antenna for moderate beam. If moderate beam selection also fails the criteria of Degrade Delta, then reverts to default strongest beam selection. This method of applying reduced antenna elements, based on Degrade Delta will be applied only during strong signal condition. Threshold of RSRP above which the method will be applied is configurable.

Referring to FIG. 22, at 2102, the CPE (402) selects the beam. At 2104, the CPE (402) measures all beams (e.g., 1H1V, 2H2V, 4H4V). At 2106, the CPE (402) determines whether the strongest beam=>–75 dBm. If the strongest beam=>–75 dBm then, at 2108, the CPE (402) determines whether 1H1V is the strongest beam. If the strongest beam is not –75 dBm, then at 2110, the CPE (402) reports the RSRP value. If 1H1V is the strongest beam then, at 2112, the CPE (402) selects the 1H1V.

If 1H1V is not the strongest beam then, at 2114, the CPE (402) finds a degrade of 1H1V against the strong beam. At 2118, the CPE (402) reports the RSRP value. At 2116, the CPE (402) determines whether the degrade <=delta. If the degrade <=delta then, at 2112, the CPE (402) selects the 1H1V.

If the degrade is not less that equal to delta then, at 2120, the CPE (402) determines whether the 2H2V is the strongest beam. If the 2H2V is the strongest beam then, at 2122, the CPE (402) selects 2H2V. If the 2H2V is not the strongest beam then, at 2124, the CPE (402) finds the degrade of 2H2V against the strong beam.

At 2126, the CPE (402) determines whether the degrade <=delta. If the degrade <=delta then, at 2122, the CPE (402) selects 2H2V. If the degrade not <=delta then, at 2130, the CPE (402) selects 4H4V. At 2130, the CPE (402) reports the RSRP value.

Figure 23A:
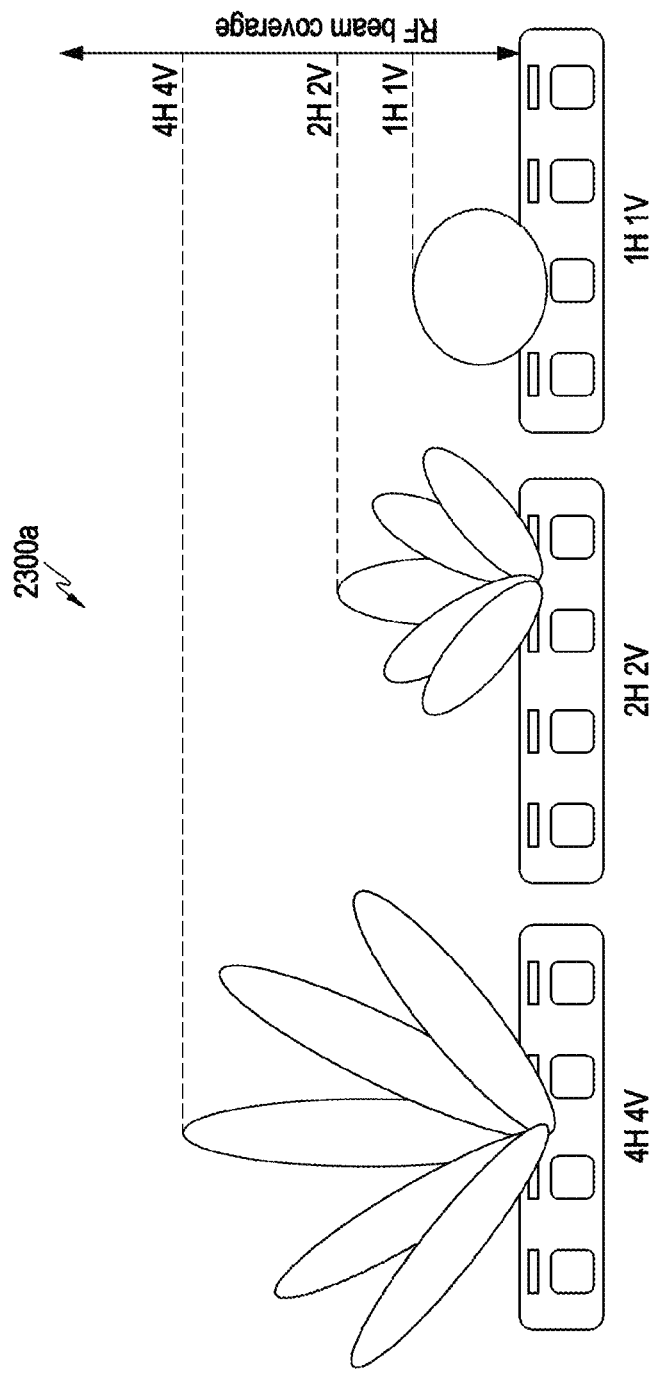
FIG. 23A is diagram illustrating an example in which 1H1V wide beam coves a lesser area, according to various embodiments.
Figure 23B:
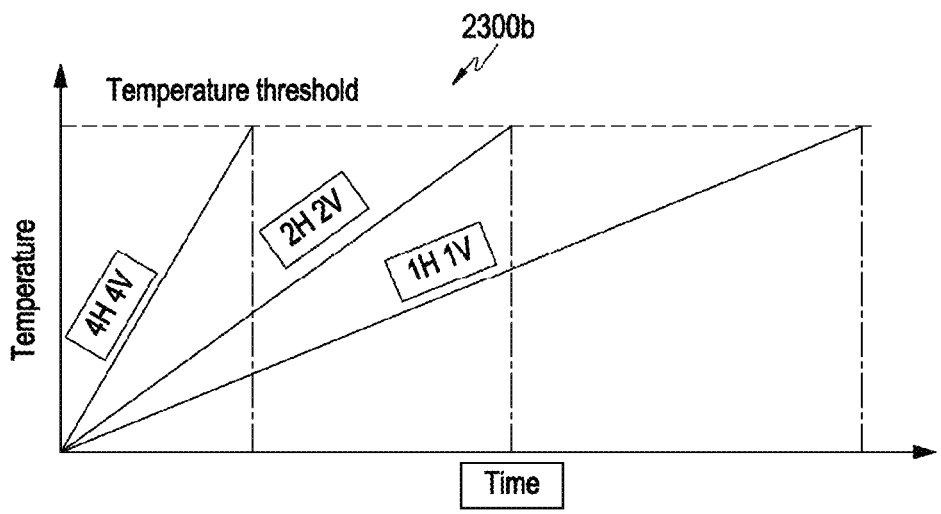
FIG. 23B is a diagram illustrating an example in which 1H1V slow thermal ramping is depicted, according to various embodiments.

FIG. 23A is diagram (2300a) illustrating an example in which 1H1V wide beam coves lesser area, according to various embodiments. FIG. 23B is a diagram (2300b) illustrating an example in which 1H1V slow thermal ramping is depicted, according to various embodiments.

Referring to FIG. 23A and FIG. 23B, the method may be used to achieve 1H1V antenna (low power antenna from array) by auto tuning of positioning of CPE (402) so that the best Antenna configurations such as 1H1V (wide beam) are selected, to apply low Tx power and reduce Thermal impact. This method is to run in conditions of low throughput requirements, where the position may be adjusted accordingly to apply low power.

Figure 24:
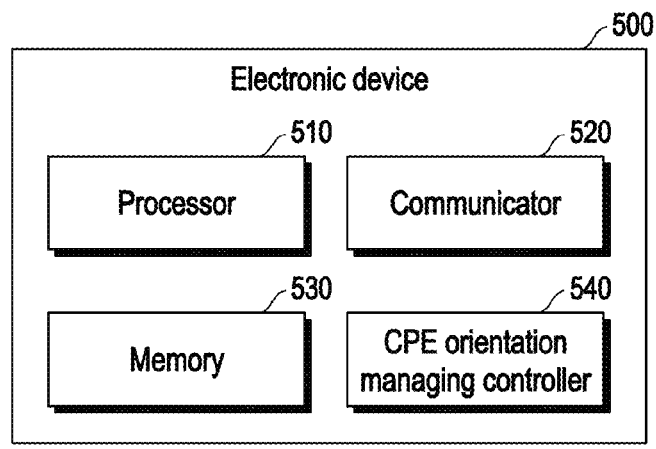
FIG. 24 is a block diagram illustrating an example configuration of an electronic device, according to various embodiments.

FIG. 24 is a block diagram illustrating an example configuration of the electronic device (500), according to various embodiments. The electronic device (500) may be, for example, but is not limited to, a laptop, a desktop computer, a notebook, a device-to-device (D2D) device, a vehicle to everything (V2X) device, a smartphone, a foldable phone, a smart TV, a tablet, an immersive device, and an internet of things (IoT) device. In an embodiment, the electronic device (500) includes a processor (e.g., including processing circuitry) (510), a communicator (e.g., including communication circuitry) (520), a memory (530) and a CPE orientation managing controller (e.g., including various processing circuitry and/or executable program instructions) (540). The processor (510) is coupled with the communicator (520), the memory (530), and the CPE orientation managing controller (540).

The CPE orientation managing controller (540) is configured to authenticate the CPE (402). After authentication, the CPE orientation managing controller (540) is configured to establish a connection between the CPE (402) and the electronic device (500). After establishing the connection between the CPE (402) and the electronic device (500), the CPE orientation managing controller (540) is configured to send the command to receive the signal strength of the CPE (402). Based on the command, the CPE orientation managing controller (540) is configured to receive the response comprising the signal strength of the CPE (402). Based on the response, the CPE orientation managing controller (540) is configured to manage orientation of the CPE (402) by performing at least one of driving the motor module (406) to rotate the CPE (402) to the orientation, drive the control module (408) to rotate at least one antenna module of the CPE (402) to the orientation, and driving the motor module (406) and the control module (408) to the orientation.

The CPE orientation managing controller (540) may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (510) may include various processing circuitry and is configured to execute instructions stored in the memory (530) and to perform various processes. Various applications are stored in the memory (530). The communicator (520) may include various communication circuitry and is configured for communicating internally between internal hardware components and with external devices via one or more networks. The memory (530) also stores instructions to be executed by the processor (510). The memory (530) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (530) may, in some examples, be considered a non-transitory storage medium. The term "non-transitory" may indicate that the storage medium is not embodied in a carrier wave or a propagated signal. However, the term "non-transitory" should not be interpreted that the memory (530) is non-movable. In certain examples, a non-transitory storage medium may store data that may, over time, change (e.g., in random access memory (RAM) or cache).

Further, at least one of the modules/controllers may be implemented through the AI model using a data driven controller (not shown). The data driven controller may be a ML model based controller and AI model based controller. A function associated with the AI model may be performed through the non-volatile memory, the volatile memory, and the processor (510). The processor (510) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Being provided through learning may refer, for example, to a predefined operating rule or AI model of a desired characteristic being made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted boltzmann machine (RBM), deep belief network (DBN), bidirectional recurrent deep neural network (BRDNN), generative adversarial networks (GAN), and deep Q-networks.

The learning algorithm may refer, for example, to a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 24 shows various hardware components of the electronic device (500) but it is to be understood that other embodiments are not limited thereon. In other embodiments, the electronic device (500) may include less or more number of components. Further, the labels or names of the components are used only for illustrative purpose and does not limit the scope of the disclosure. One or more components may be combined together to perform same or substantially similar function in the electronic device (500).

Figure 25:
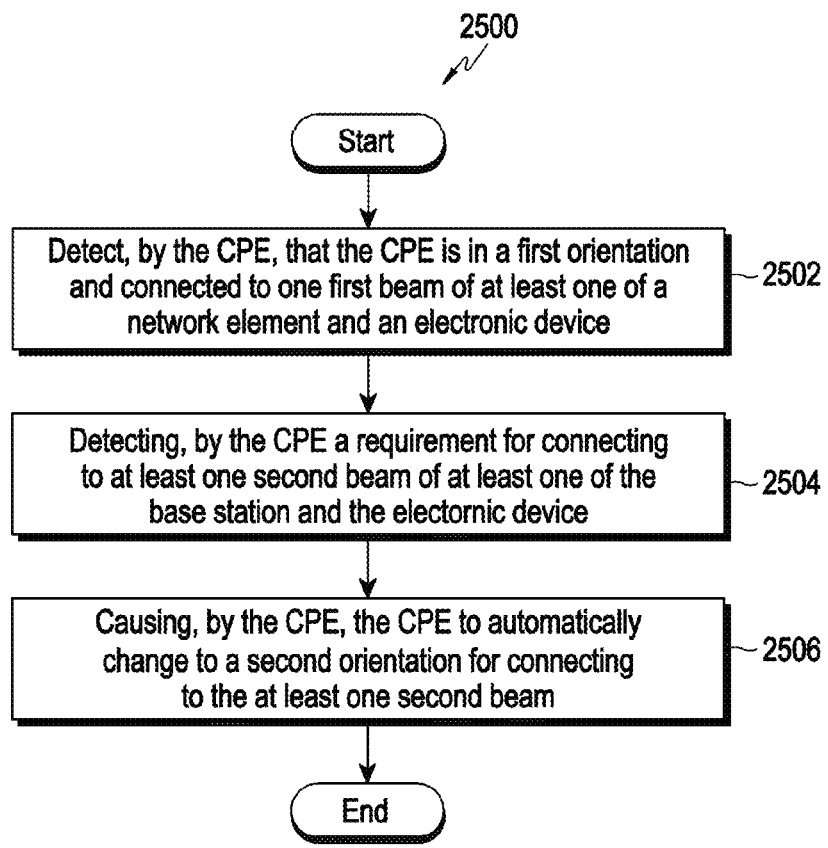
FIG. 25 is a flowchart illustrating an example method, implemented by the CPE, for managing orientation of the CPE, according to various embodiments.

FIG. 25 is a flowchart (2500) illustrating an example method, implemented by the CPE, for managing orientation of the CPE (402), according to embodiments as disclosed herein. The operations (2502-2506) are performed by the CPE (402). At 2502, the method includes detecting that the CPE (402) is in the first orientation and connected to the one or more first beam of the network element (600) and the electronic device (500). At 2504, the method includes detecting the requirement for connecting to the one or more second beam of the network element (600) and the electronic device (500). At 2506, the method includes causing the CPE (402) to automatically change to the second orientation for connecting to the second beam.

Figure 26:
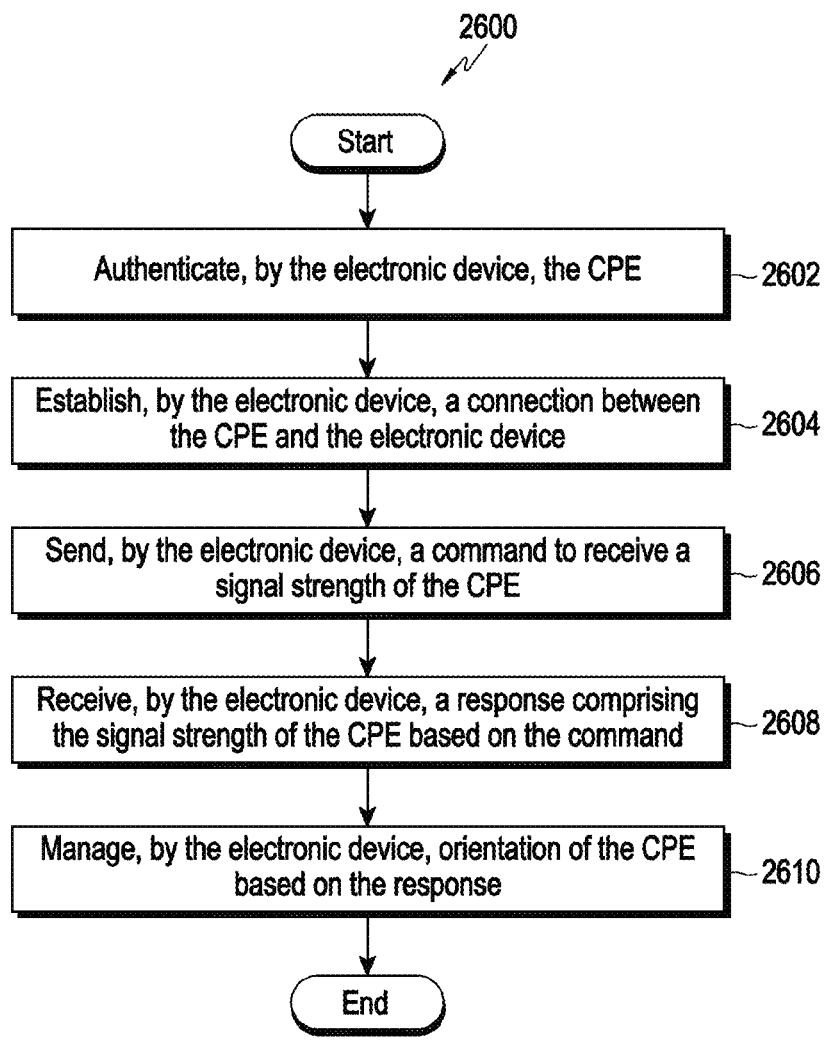
FIG. 26 is a flowchart illustrating an example method, implemented by an electronic device, for managing orientation of the CPE, according to various embodiments.

FIG. 26 is a flowchart (2600) illustrating an example method, implemented by the electronic device (500), for managing orientation of the CPE (402), according to various embodiments. The operations (2602-2610) are performed by the CPE orientation managing controller (540). At 2602, the method includes authenticating the CPE (402). At 2604, the method includes establishing the connection between the CPE (402) and the electronic device (500). At 2606, the method includes sending the command to receive the signal strength of the CPE (402). At 2608, the method includes receiving the response comprising the signal strength of the CPE (402) based on the command. At 2610, the method includes causing to manage orientation of the CPE (402) based on the response. In the disclosure, the motor module (410) may perform the operation for position the CPE (402) to receive the beam at the angle and the direction of rotation, but it could be possible that other moving unit such as sensor, a magnetic based moving unit, a hall effect based conductive motion unit or the like also used for position the CPE (402) to receive the beam at the angle and the direction of rotation.

The various actions, acts, blocks, steps, or the like in the flow charts (1700, 1800, 1900, 2200, 2500, and 2600) may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein may be implemented through at least one software program running on at least one hardware device and performing network management functions to control the elements.

It is to be understood that the phraseology or terminology employed herein is for the purpose of description and not of limitation. Therefore, while the embodiments herein have been described in terms of various embodiments, those skilled in the art will recognize that the embodiments herein can be practiced with modification within the spirit and scope of the disclosure as described herein.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A system configured to manage an orientation of a consumer premise equipment (CPE), the system comprising:
    a mounting pivot;
    at least one moving unit including a motor,
    wherein the at least one moving unit is disposed between the mounting pivot and the CPE;
    at least one motor module including a motor; and
    at least one control module comprising circuitry,
    wherein the at least one motor module and the at least one control module are included in the CPE,
    wherein the at least one control module and the at least one motor module being configured to position the CPE at an angle and a direction of rotation comprises:
    the at least one control module configured to send a request comprising a current angular position of the CPE to the at least one motor module;
    the at least one motor module configured to receive the request and send the current angular position comprising at least one of an azimuth angle and a zenith angle to the at least one control module based on the request;
    the at least one control module configured to:
    receive the current angular position comprising at least one of the azimuth angle and the zenith angle from the at least one motor module;
    obtain at least one of a modem radio frequency (RF) parameter;
    determine a position of the CPE based on the at least one of the modem RF parameter and the current angular position including at least one of the azimuth angle and the zenith angle;
    determine that the position of the CPE is not same as the current angular position; and
    send an angular position command comprising a new position of the CPE to the at least one motor module;
    the motor module configured to:
    receive the angular position command comprising the new position from the at least one control module; and
    set the new position of the CPE based on the angular position command comprising the new position.

2. The system as claimed in claim 1, wherein the at least one azimuth angle is determined by:
    determining whether a current reference signal receive power (RSRP) does not meet a specified threshold;
    changing an azimuth angle position by a first single step of the rotation of the motor module based on the current RSRP not meeting the specified threshold;
    obtaining a new RSRP;
    determining whether the new RSRP is greater than the current RSRP;
    changing an azimuth angle position by a second single step of the rotation of the motor module based on determining that the new RSRP is greater than the current RSRP.

3. The system as claimed in claim 1, wherein the control module is configured to:
    monitor the orientation of the CPE over a period of time using a machine learning module based on a usage pattern;
    store the orientation of the CPE; and
    apply the orientation of the CPE using the machine learning module.

4. The system as claimed in claim 1, wherein the at least one control module and the at least one motor module are configured to position the CPE to receive at least one beam at an angle and a direction of rotation by:
    authenticating the CPE by an electronic device;
    establishing, by the electronic device, a connection between the CPE and the electronic device;
    sending, by the electronic device, a command to receive a signal strength of the CPE;
    receiving a response comprising the signal strength of the CPE based on the command by the electronic device; and
    managing orientation of the CPE based on the response by the electronic device.

5. The system as claimed in claim 1, wherein the at least one moving unit is embedded in the mounting pivot, wherein the at least one moving unit comprises at least one of a motor module comprising a motor, a sensor, a magnetic based moving unit, a hall effect based conductive motion unit.

6. The system as claimed in claim 1, wherein the at least one control module and the at least one motor module are configured to select at least one antenna comprising a low power.

7. The system as claimed in claim 1, wherein the at least one beam comprises a wider beam and a narrower beam.

8. The system as claimed in claim 1, wherein the at least one zenith angle is determined by:
- determining whether a current reference signal receive power (RSRP) does not meet a specified threshold;
- changing a zenith angle position by a first single step of the rotation of the motor module based on the current RSRP not meeting the specified threshold;
- obtaining a new RSRP;
- determining whether the new RSRP is greater than the current RSRP;
- changing a zenith angle position by a second single step of the rotation of the motor module based on the new RSRP being greater than the current RSRP.

9. The system as claimed in claim 1, wherein a power supply is provided to at least one the CPE and the at least one moving unit using at least one port.

10. The system as claimed in claim 1, wherein the system comprises at least one gear configured to control rotation of the at least one moving unit.

* * * * *